US012274303B2

(12) United States Patent
Liu

(10) Patent No.: US 12,274,303 B2
(45) Date of Patent: Apr. 15, 2025

(54) HEATING ASSEMBLY

(71) Applicant: Shenzhen Eigate Technology Co., Ltd., Shenzhen (CN)

(72) Inventor: Tuanfang Liu, Shenzhen (CN)

(73) Assignee: ASPIRE NORTH AMERICA LLC

(*) Notice: Subject to any disclaimer, the term of this patent is extended or adjusted under 35 U.S.C. 154(b) by 474 days.

(21) Appl. No.: 17/677,956

(22) Filed: Feb. 22, 2022

(65) Prior Publication Data

US 2023/0058211 A1 Feb. 23, 2023

(30) Foreign Application Priority Data

Aug. 17, 2021 (CN) ......................... 202110942644.2
Aug. 17, 2021 (CN) ......................... 202121936364.2

(51) Int. Cl.

| | |
|---|---|
| ***A24F 40/465*** | (2020.01) |
| ***A24F 40/20*** | (2020.01) |
| ***A24F 40/48*** | (2020.01) |
| ***A24F 40/51*** | (2020.01) |
| ***A24F 40/57*** | (2020.01) |
| ***H05B 6/10*** | (2006.01) |

(52) U.S. Cl.

CPC ............ *A24F 40/465* (2020.01); *A24F 40/20* (2020.01); *A24F 40/48* (2020.01); *A24F 40/51* (2020.01); *A24F 40/57* (2020.01); *H05B 6/108* (2013.01)

(58) Field of Classification Search

CPC .......... A24F 40/20; A24F 40/48; A24F 40/51; A24F 40/57; A24F 40/465; H05B 6/108

See application file for complete search history.

(56) References Cited

U.S. PATENT DOCUMENTS

2013/0192623 A1* 8/2013 Tucker .................. A61M 15/06 131/329
2018/0310617 A1* 11/2018 Ding .................... H05B 1/0227
2020/0085103 A1* 3/2020 Zhang ..................... A24F 40/46
2020/0170300 A1* 6/2020 Gill ......................... A24F 40/57
2020/0345070 A1* 11/2020 Ding ......................... A24F 7/02
2023/0180839 A1* 6/2023 Li ........................... A24F 40/51 131/329

FOREIGN PATENT DOCUMENTS

WO WO-2021228157 A1 * 11/2021 ............ A24F 40/20

* cited by examiner

*Primary Examiner* — Christopher M Rodd
*Assistant Examiner* — Adam Z Baratz
(74) *Attorney, Agent, or Firm* — MATTHIAS SCHOLL P.C.; Matthias Scholl

(57) ABSTRACT

A heating assembly includes a main body and a high-frequency control assembly. The main body includes a heating chamber provided with a first opening. The main body further includes a heating element disposed in the heating chamber. The high-frequency control assembly is disposed outside the heating chamber. When in use, a tobacco material passes through the first opening and is disposed into the heating chamber; when the high-frequency control assembly is energized, an electromagnetic filed is produced, and the heating element produces heat to heat the tobacco material.

9 Claims, 8 Drawing Sheets

HEATING ASSEMBLY

CROSS-REFERENCE TO RELATED APPLICATIONS

Pursuant to 35 U.S.C. § 119 and the Paris Convention Treaty, this application claims foreign priority to Chinese Patent Application No. 202110942644.2 filed Aug. 17, 2021, and to Chinese Patent Application No. 202121936364.2 filed Aug. 17, 2021. The contents of all of the aforementioned applications, including any intervening amendments thereto, are incorporated herein by reference.

BACKGROUND

The disclosure relates to the field of electronic cigarettes, and more particularly to a heating assembly.

Conventionally, a resistive heater is used for tobacco heating in an electric heating assembly. Heat is transferred from the resistive heater through an aluminum pipe to the tobacco material, and the tobacco material is heated to produce smoke. However, the resistive heater requires preheating, with low thermal efficiency, and low thermal stability.

SUMMARY

The disclosure provides a heating assembly comprising a main body and a high-frequency control assembly. The main body comprises a heating chamber provided with a first opening; the main body further comprises a heating element disposed in the heating chamber; the high-frequency control assembly is disposed outside the heating chamber; when in use, a tobacco material passes through the first opening and is disposed into the heating chamber; when the high-frequency control assembly is energized, an electromagnetic filed is produced, and the heating element produces heat to heat the tobacco material. The tobacco material in the heating chamber is heated to produce smoke.

The term "tobacco material" used herein refers to tobacco products capable of being heated to generate aerosol, such as smoke. The tobacco material comprises cigarette or cartridges, preferably, disposable products.

In a class of this embodiment, the heating element comprises a thermal air chamber comprising an outer wall. The outer wall comprises at least one first through hole through which the thermal air chamber communicates with outside air of the heating element. The thermal air chamber is configured to increase heating area and heat energy, allow for air conduction and heat transfer, and provides uniform heating throughout the surface of the tobacco material, thus improving the taste of tobacco smoke. When electric resistance is used in the heating element, the inner and outer surfaces of the heating element stay energized, which may result in short or open circuits. Electric resistance heating is an expensive process that requires advanced technology. The heating element can generate heat by electromagnetic induction, thus preventing short or opening circuits.

In a class of this embodiment, the high-frequency control assembly comprises a coil and a power supply unit. The coil is configured to produce an electromagnetic field that enables the heating element to produce heat. The power supply unit is electrically connected to the coil so as to provide alternating current to the coil. The coil is wound into a helix with a hollow space. The heating chamber is disposed in the hollow space. When the alternating current passes through the coil, the electromagnetic field is produced in the hollow space, allowing for a denser charge on the surface of the heating element. The denser charge results in collision between atoms in which kinetic energy is used to generate heat.

In a class of this embodiment, the power supply unit comprises a battery and a high-frequency control board. The battery is electrically connected to the high-frequency control board to supply power to the high-frequency control board. The high-frequency control board is further electrically connected to the coil and a temperature sensor so as to provide alternating current to the coil and receive information about the temperature changes of the heating element. The high-frequency control board comprises an LC circuit which can output alternating current.

In a class of this embodiment, the main body further comprises a housing and a bracket. The housing comprises a first end provided with a cavity. The bracket is disposed in the housing. The bracket comprises an empty space. The high-frequency control assembly is disposed in the empty space and the coil is disposed in the cavity.

In a class of this embodiment, the main body further comprises a cover provided with a first end. The first end is concave to form a first recess. The first recess comprises a first bottom wall provided with a second opening. The cover further comprises an air duct communicating with the second opening. The air duct extends into the hollow space.

In a class of this embodiment, the main body further comprises a fixing member configured to hold the tobacco material. One end of the fixing member is concave to form a second recess. The second recess comprises a second bottom wall and the first opening is disposed on the second bottom wall. The fixing member comprises a sliding member disposed in the second recess and slidable along the inner wall of the second recess. The other end of the fixing member is in the form of a necked part which is matched with the inner wall of the first recess in size and shape. The fixing member further comprises a hollow tube communicating with first opening through the necked part. The hollow tube corresponds with the first opening. The hollow tube functions as the heating chamber. The sliding member is moved to one end of the second recess to ensure that the tobacco material can be disposed into the first opening. The sliding member is moved to the other end of the second recess so that the first opening is closed.

In a class of this embodiment, the fixing member is detachably disposed in the cavity. The necked part is disposed into the first recess. The hollow tube is disposed through the second opening into the air duct. An air channel is formed between the outer wall of the hollow tube and the inner wall of the air duct. A gap is formed between the outer wall of the necked part and the inner wall of the first recess. When a user smokes the tobacco material, the air flows through the gap, the air channel, the at least one first through hole, and the thermal air chamber, causing the heating element to generate heat. The heating chamber is filled with hot air so that the heat is transferred to the tobacco materials. The tobacco materials are heated by the heating element and the hot air to produce smoke. The air forces the smoke to flow out of the first opening or a filter tip disposed outside the first opening.

In a class of this embodiment, the main body further comprises a seal member disposed in one end of the air duct and configured to seal the air channel; the seal member comprises a third recess provided with a second through hole; one end of the heating element is fixedly disposed in the third recess so that the thermal air chamber communicates with the second through hole; and the temperature sensor comprises a conducting wire connected through the second through hole to the high-frequency control board.

In a class of this embodiment, the heating assembly further comprises a temperature sensor and the thermal air chamber comprises a separate chamber; the temperature sensor is disposed in the separate chamber; the heating element is in an elongated shape; the separate chamber is disposed in the middle of the heating element and extends along the length of the heating element to allow for an accurate temperature measurement for thermal air. The temperature sensor is configured to measure the temperature of the heating element to ensure that the tobacco materials are heated within a certain temperature range.

The following advantages are associated with the heating assembly of the disclosure: the heating assembly heats tobacco materials through high-frequency electromagnetic induction, which offers advantages in shorter preheat time, increased thermal efficiency, and higher thermal stability over related art heating assemblies.

Figure 1:
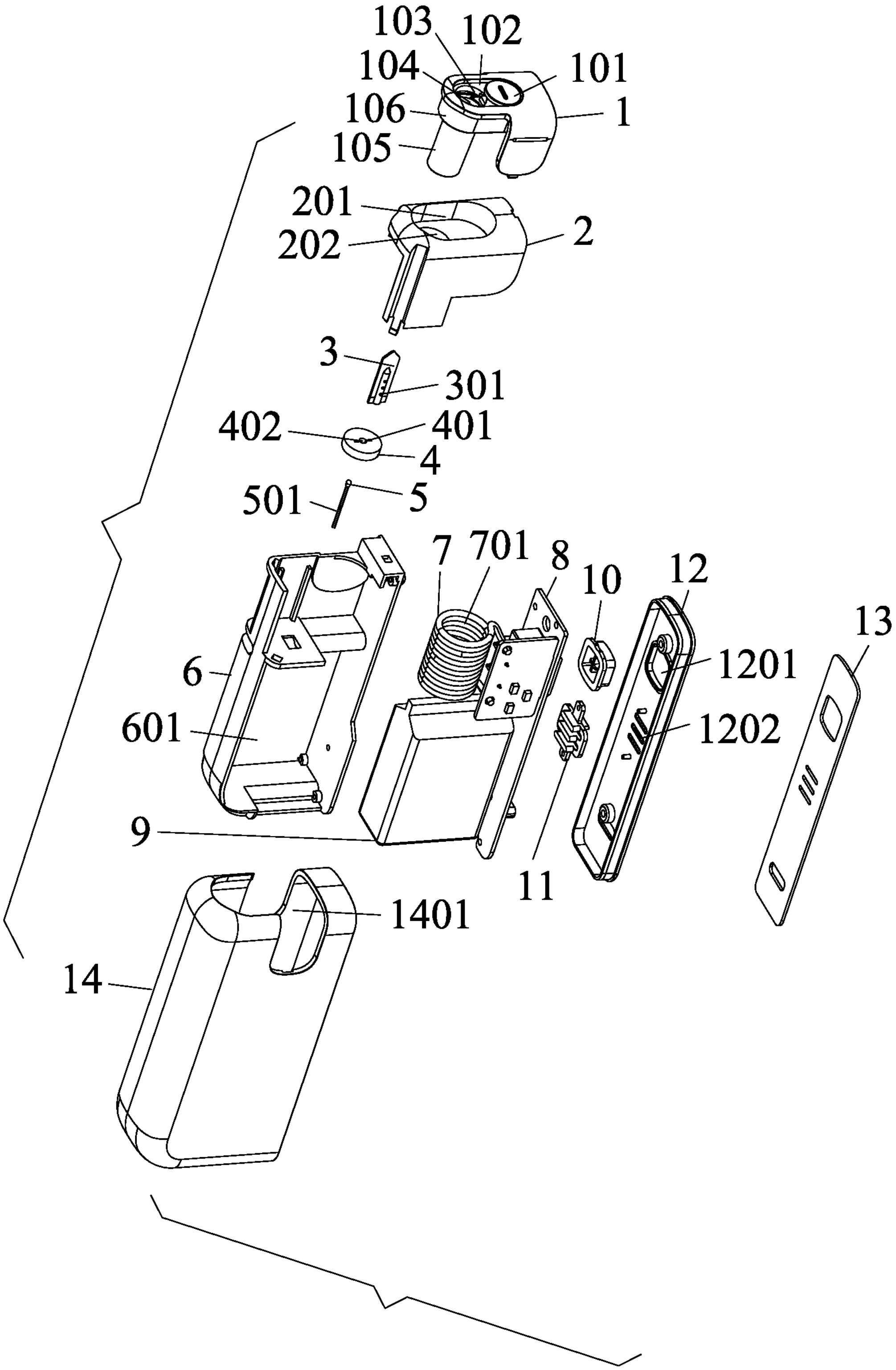
FIG. 1 is an exploded view of a heating assembly according to one of the disclosure.

In the drawings, the following reference numbers are used: 1. Main body; 2. Cover; 3. Heating element; 4. Seal member; 5. Temperature sensor; 6. Bracket; 7. Coil; 8. High-frequency control board; 9. Battery; 10. Power button; 11. Light guide plate; 12. Button bracket; 13. Decorative plate; 14. Housing; 101. Sliding member; 102. Second recess; 103. First opening; 104. Heating chamber; 105. Hollow tube; 106. Necked part; 201. First recess; 202. Second recess; 203. Air duct; 204. Air channel; 301. First through hole; 302. Thermal air chamber; 3021. First chamber; 3022. Second chamber; 308. Side wall; 309. First side wall; 401. Third recess; 402. Second through hole; 601. Empty space; 701. Hollow space; 1201. Button hole; 1202. Light hole; and 1404. Cavity.

DETAILED DESCRIPTION

To further illustrate the disclosure, embodiments detailing a heating assembly are described below. It should be noted that the following embodiments are intended to describe and not to limit the disclosure.

Referring to FIGS. 1-8, a heating assembly comprises a main body, heating element 3, and a high-frequency control assembly. The main body comprises a heating chamber 104 provided with a first opening 103. Tobacco materials are disposed through the first opening 103 into the heating chamber 104. The main body further comprises a heating element 3 disposed in the heating chamber 104. The high-frequency control assembly is disposed outside the heating chamber 104. The high-frequency control assembly is energized and generates an electromagnetic filed, causing the heating element 3 to produce heat. The tobacco materials in the heating chamber 104 are heated to produce smoke.

The high-frequency control assembly comprises a coil 7 and a power supply unit. The coil 7 is configured to produce an electromagnetic field that can generate electric current, causing the heating element 3 to produce heat. The power supply unit is electrically connected to the coil 7 so as to provide alternating current to the coil 7. The coil 7 is wound into a helix with a hollow space 701. The heating chamber 104 is disposed in the hollow space 701. When the alternating current passes through the coil 7, the electromagnetic field is produced in the hollow space 701, allowing for a dense charge on the surface of the heating element 3. The dense charge results in collision between atoms in which kinetic energy is used to generate heat.

The heating element 3 comprises a thermal air chamber 302 comprising a first chamber 3021. The heating assembly further comprises a temperature sensor 5 disposed in the first chamber 3021. The heating element 3 comprises an outer wall provided with at least one first through hole 301 communicating with the thermal air chamber 302. The heating element 3 comprises a conductive metal. The thermal air chamber 302 and the at least one first through hole 301 are configured to allow air to flow through. The heat generated by the heating chamber 104 flows through the at least one first through hole 301 and is transferred to the tobacco materials, thus providing a uniform heating and improving the taste of tobacco smoke. The temperature sensor is configured to measure the temperature of the heating element to ensure that the tobacco materials is heated within a certain temperature range.

The heating element 3 comprises a conductive metal, including but not limited to, copper, silver, gold, tungsten, aluminum, and nickel. Optionally, the heating element 3 comprises a rigid non-conductive material, including but not limited to, stainless steel, iron, titanium, chromium, and quartz. In certain examples, the heating element 3 comprises a rigid non-conductive material, the outer wall of the heating element 3 is wrapped with a conductive layer (not shown). In certain examples, the conductive layer is further disposed on the inner wall of the thermal air chamber 302. In certain examples, the conductive layer is further disposed on a sidewall surrounding the at least one first through hole 301. The conductive layer can be any shape or form including a planar shape, a grip shape, or other shape. The conductive layer comprises a conductive metal, including but not limited to, copper, silver, gold, tungsten, aluminum, and nickel.

The heating element 3 further comprises a passivation layer (not shown). When the heating element 3 comprises a conductive metal, the passivation layer is disposed on the outer wall of the heating element 3, and/or the inner wall of the thermal air chamber 302, and/or the sidewall surrounding the at least one first through hole 301. In certain examples, the heating element 3 comprises a rigid non-conductive material and the conductive layer, the passivation layer is disposed on the conductive layer. Understandably, the passivation layer is disposed on the conductive layer, and/or the heating element, and/or the inner wall of the thermal air chamber 302, and/or the sidewall surrounding the at least one first through hole 301. Understandably, the passivation layer can be disposed only on the conductive layer. The passivation layer comprises inert metal, anti-oxidation metal, glass, glaze, ceramic, mica, quartz, agate, or a combination thereof.

The heating element further comprises a top part and the first chamber comprises a top portion. A preset distance is maintained between the top part and the top portion, thus preventing a mouthpiece from overheating due to thermal air. The preset distance is 2-6 mm.

In certain examples, the thermal air chamber 302 further comprises a second chamber 3022 communicating with the first chamber 3021. The second chamber 3022 can be of any shape without departing from the scope and spirit of the disclosure. The second chamber 3022 can directly communicate with the first chamber 3021 or it can be affixed thereto through at least one hole or channel. In certain examples, the at least one first through hole 301 is disposed only on the side wall surrounding the second chamber 3022, so that the second chamber 3022 communicates with outside air of the heating element through the at least one first through hole 301. In certain examples, the side walls that surround the first chamber 3021 and the second chamber 3022 separately comprise the at least one first through hole 301. The second chamber 3022 is configured to increase heating area and thermal air, thus providing uniform heating throughout the surface of the tobacco materials.

The at least one first through hole 301 can be disposed on the side wall of the first chamber 3021, so that the first chamber 3021 communicates with outside air of the heating element 3 through the at least one first through hole 301. Optionally, the at least one first through hole 301 can be disposed on the side wall of the second chamber 3022, so that the second chamber 3022 communicates with outside air of the heating element 3 through the at least one first through hole 301. Optionally, the at least one first through hole 301 can be disposed on the side walls surrounding the first chamber 3021 and the second chamber 3022.

The at least one first through hole 301 is disposed below the top portion of the first chamber 3021, so that the temperature sensor is close to the at least one first through hole 301 to ensure an accurate temperature measurement for thermal air. A distance is maintained between the at least one first through hole 301 and the top part of the heating element 3 to reduce the thermal air into the top part of the heating element 3, thus preventing the mouthpiece from overheating.

The heating element 3 comprises an elongated sheet 307, a first side wall 309, and a second side wall. The first side wall 309 and the second side wall are disposed opposite each other so as to form the first chamber 3201. The first side wall 309 and/or the second side wall are disposed on the elongated sheet 307.

In certain examples, the elongated sheet 307 comprises a notch 305 extending along the length of the elongated sheet 307. The notch 305 is surrounded by the first side wall 309 and the second side wall to form the first chamber 3021. At least one of the first side wall 309 and the second side wall is convex with respect to the elongated sheet 307.

In certain examples, the heating element 3 comprises the side wall 308 surrounding a first space. The side wall 308 comprises the first side wall 309 and the second side wall disposed opposite to the first side wall 309. The first chamber 3021 is surrounded by the first side wall 309 and the second side wall. The second chamber 3022 comprises the space outside of the first chamber.

The power supply unit comprises a battery 9 and a high-frequency control board 8. The battery 9 is electrically connected to the high-frequency control board 8 so as to supply power to the high-frequency control board 8. The high-frequency control board 8 is further electrically connected to the coil 7 and the temperature sensor 5 so as to provide alternating current to the coil 7 and receive information about the temperature changes of the heating element 3. The high-frequency control board 8 comprises an LC circuit which can output alternating current.

The main body further comprises a housing 14 and a bracket 6. The housing 14 comprises a first end provided with a cavity 1401. The bracket 6 is disposed in the housing 14. The bracket 6 comprises an empty space 601. The high-frequency control assembly is disposed in the empty space 601 and the coil 7 is disposed in the cavity 1401.

The main body further comprises a cover 2 provided with a first end. The first end is concave to form a first recess 201. The first recess 201 comprises a first bottom wall provided with a second opening 202. The cover 2 further comprises an air duct 203 communicating with the second opening 202. The cover 2 is disposed into the cavity 1401 so that the air duct 203 extends in the hollow space 701.

The main body further comprises a fixing member 1 configured to hold the tobacco materials. One end of the fixing member 1 is concave to form a second recess 102. The second recess 102 comprises a second bottom wall provided with the first opening 103. The fixing member 1 comprises a sliding member 101 disposed in the second recess 102 and slidable along the inner wall of the second recess 201. The other end of the fixing member 1 is in the form of a necked part 106 matched with the inner wall of the first recess 201 in the size and shape. The fixing member 1 further comprises a hollow tube 105 communicating with first opening 103 through the necked part 106. The hollow tube 105 corresponds with the first opening 103. The hollow tube 105 functions as the heating chamber 104. The sliding member 101 is moved to one end of the second recess 102 to ensure that the tobacco materials can be disposed into the first opening 103. The sliding member 101 is moved to the other end of the second recess 102 so that the first opening 103 is closed.

The fixing member 1 is detachably disposed in the cavity 1401. The necked part 106 is disposed into the first recess 201. The hollow tube 105 is disposed through the second opening 202 into the air duct 203. An air channel 204 is formed between the outer wall of the hollow tube 105 and the inner wall of the air duct 203. A gap is formed between the outer wall of the necked part 106 and the inner wall of the first recess 201. When a user smokes the tobacco materials, the air flows through the gap, the air channel 204, the at least one first through hole 301, and the thermal air chamber 302, causing the heating element 3 to generate heat. The heating chamber 104 is filled with hot air so that the heat is transferred to the tobacco materials. The tobacco materials are heated by the heating element and the hot air to produce smoke. The air forces the smoke to flow out of the first opening 103 or a filter tip disposed outside the first opening 103.

The main body further comprises a seal member 4 disposed in one end of the air duct 203 and configured to seal the air channel 204. The seal member 4 comprises a third recess 401 provided with a second through hole 402. One end of the heating element 3 is fixedly disposed in the third recess 401 so that the thermal air chamber 302 communicates with the second through hole 402. The temperature sensor 5 comprises a conducting wire connected through the second through hole 402 to the high-frequency control board 8.

Figure 2:
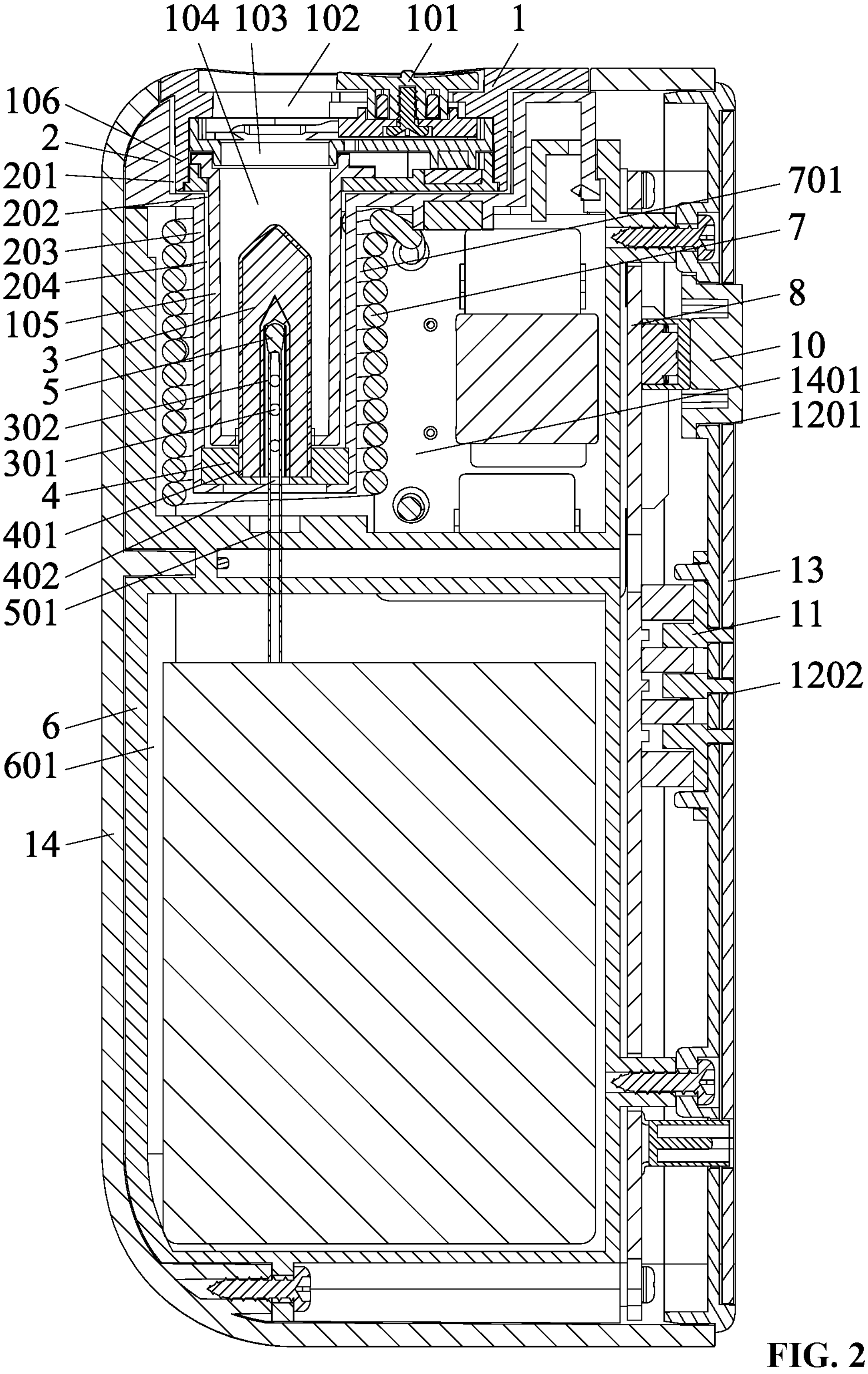
FIG. 2 is a cross-sectional view of a heating assembly according to one example of the disclosure.
Figure 3:
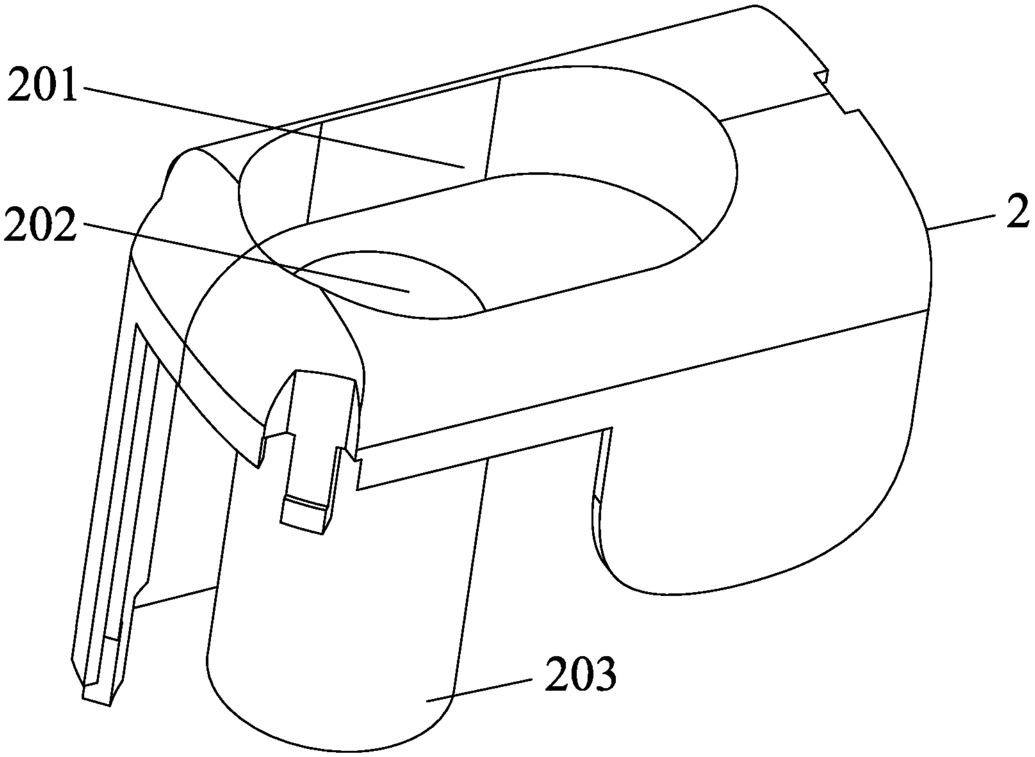
FIG. 3 is a perspective view of a cover according to one example of the disclosure.
Figure 4:
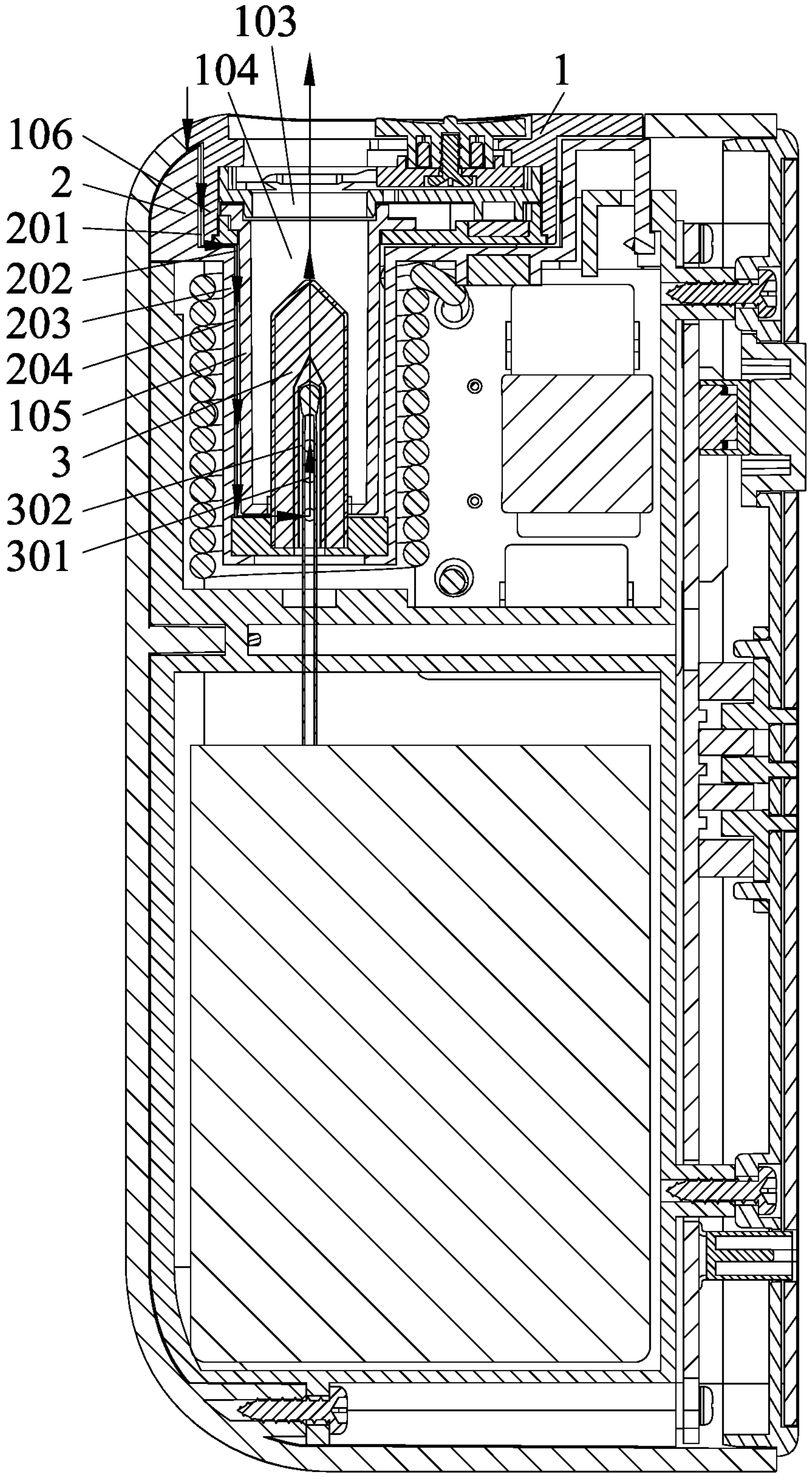
FIG. 4 is a cross-sectional view including arrows showing the direction of the air flow in a heating assembly according to one example of the disclosure.

Referring to FIGS. 1-3, a heating assembly comprises a main body 1, a cover 2, a heating element 3, a seal member 4, a temperature sensor 5, a bracket 6, a coil 7, a high-frequency control board 8, a battery 9, a power button 10, a light guide plate 11, a button bracket 12, a decorative plate 13, and a housing 14. An output terminal of the battery 9 is connected to the input terminal of the high-frequency control board 8 so as to provide power to the high-frequency control board 8. The output terminal of the high-frequency control board 8 is connected to the input terminal of the coil 7 so as to provide alternating current to the coil 7. The high-frequency control board 8 comprises an LC circuit which can output alternating current. The housing 14 comprises a first end provided with a cavity 1401. The bracket 6 comprises an empty space 601. The bracket 6 is fixedly disposed in the housing 14. The coil 7, the high-frequency control board 8, and the battery 9 are disposed in the empty space 601. The coil 7 is disposed in the cavity 1401. The power button 10 is disposed on the high-frequency control board 8 so as to turn on or off a power supply of the heating assembly. The light guide plate 11 is transparent and disposed on the high-frequency control board 8, through which the power state and battery information are displayed. The button bracket 12 comprises a button hole 1201 and a light hole 1202. The button bracket 12 is disposed one side of the housing 14 with the power button 10 exposed outside the button hole 1201. The light guide plate 11 is disposed opposite to the light hole 1202. The decorative plate 13 is fixedly disposed on the surface of the button bracket 12. The cover 2 is fixedly disposed into the cavity 1401. The cover 2 comprises a first end and the first end is concave to form a first recess 201. The first recess 201 comprises a first bottom wall provided with a second opening 202. The cover 2 further comprises an air duct 203 communicating with the second opening 202. The coil 7 is wound into a helix with a hollow space 701. The cover 2 is disposed into the cavity 1401 so that the air duct 203 extends in the hollow space 701. One end of the fixing member 1 is concave to form a second recess 102. The second recess 102 comprises a second bottom wall provided with the first opening. The fixing member 1 comprises a sliding member 101 disposed in the second recess 102 and slidable along the inner wall of the second recess 201. The sliding member 101 is moved to one end of the second recess 102 to ensure that the tobacco materials can be disposed into the first opening 103. The sliding member 101 is moved to the other end of the second recess 102 so that the first opening 103 is closed. The other end of the fixing member 1 is in the form of a necked part 106 matched with the inner wall of the first recess 201 in the size and shape. The fixing member 1 further comprises a hollow tube 105 communicating with first opening 103 through the necked part 106. The hollow tube 105 corresponds with the first opening 103. The hollow tube 105 functions as the heating chamber 104. The fixing member 1 is detachably disposed in the cavity 1401. The necked part 106 is disposed into the first recess 201. The hollow tube 105 is disposed through the second opening 202 into the air duct 203. An air channel 204 is formed between the outer wall of the hollow tube 105 and the inner wall of the air duct 203. A gap is formed between the outer wall of the necked part 106 and the inner wall of the first recess 201. The seal member 4 is disposed in the bottom end of the air duct 203 and is configured to seal the air channel 204. The seal member 4 comprises a third recess 401 provided with a second through hole 402. The bottom end of the heating element 3 is fixedly disposed in the third recess 401 and the heating element 3 is disposed within the heating chamber 104. The heating element 3 comprises a thermal air chamber 302 comprising a first chamber 3021. The temperature sensor 5 is disposed in the first chamber 3021. The heating element 3 comprises an outer wall provided with at least one first through hole 301 communicating with the thermal air chamber 302. The thermal air chamber 302 communicates with the second through hole 402. The temperature sensor 5 comprises a conducting wire connected through the second through hole 402 to the high-frequency control board 8. The temperature sensor 5 is configured to measure the temperature of the heating element 3 and feedback to the high-frequency control board with the temperature information. FIG. 4 is a cross-sectional view including arrows showing the direction of the air flow in the heating assembly. When a user smokes the tobacco materials, the air flows through the gap, the air channel 204, the at least one first through hole 301, and the thermal air chamber 302, causing the heating element 3 to generate heat. The heating chamber 104 is filled with hot air so that the heat is transferred to the tobacco materials. The tobacco materials are heated by the heating element and the hot air to produce smoke. The air forces the smoke to flow out of the first opening 103 or a filter tip disposed outside the first opening 103.

Example 1

Figure 5:
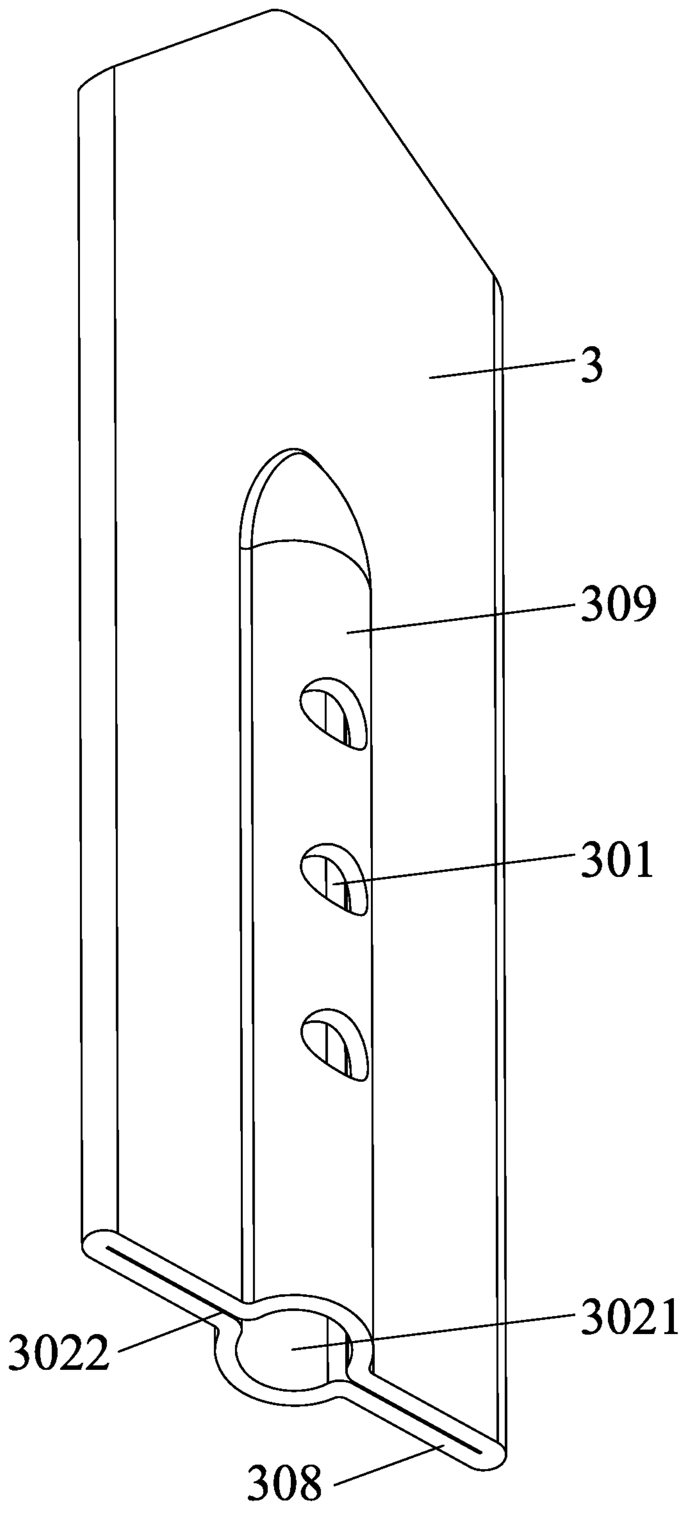
FIG. 5 is a perspective view of a heating element according to Example 1 of the disclosure.

Referring to FIG. 5, the heating element 3 is in an elongated shape. The heating element 3 comprises a sealed top end in the shape of a triangle and thus can be inserted into tobacco materials. The heating element 3 further comprises a side wall 308 surrounding a first space. A part of the side wall 308 is squeezed to form an elongated sheet with a protrusion part. The protrusion part comprises a first side wall 309 and a second side wall (not shown). The first space comprises a first chamber 3021 which functions as a thermal air chamber 302 defined by the first side wall 309 and the second side wall. One end of the first chamber 3021 is sealed with the other end opened, thus allowing the insertion of a temperature sensor 5 into the first chamber 3021. Both the first side wall 309 and the second side wall separately comprise at least one through hole 301.

Example 2

Figure 6:
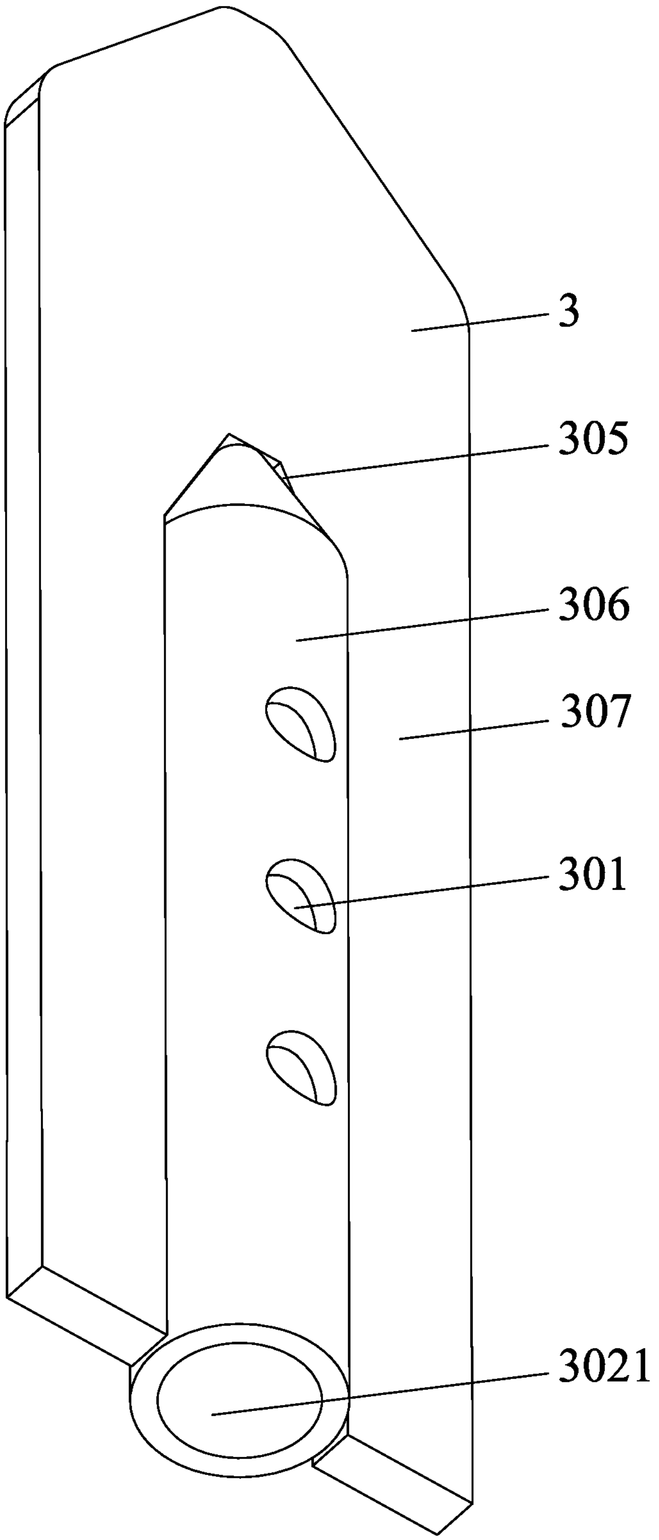
FIG. 6 is a perspective view of a heating element according to Example 2 of the disclosure.

Referring to FIG. 6, the heating element 3 comprises an elongated sheet 307 and a tube 306. The elongated sheet 307 comprises a top end in the shape of a triangle. One end of the tube 306 is sealed with the other end opened, thus allowing the insertion of a temperature sensor 5 into the tube 306. The elongated sheet 307 further comprises a notch 305 extending along the length of the heating element 3. The tube 306 is fixedly disposed in the notch 305 with the sealed end abutting against the surface of the elongated sheet 307. The tube 306 comprises a first side wall 309 and a second side wall formed integrally with the first side wall 309. A first chamber 3021 is surrounded by the first side wall 101 and the second side wall. The first side wall 309 and the second side wall are convex with respect to the elongated sheet 307. Both the first side wall 309 and the second side wall separately comprise at least one through hole 301.

Example 3

Figure 7:
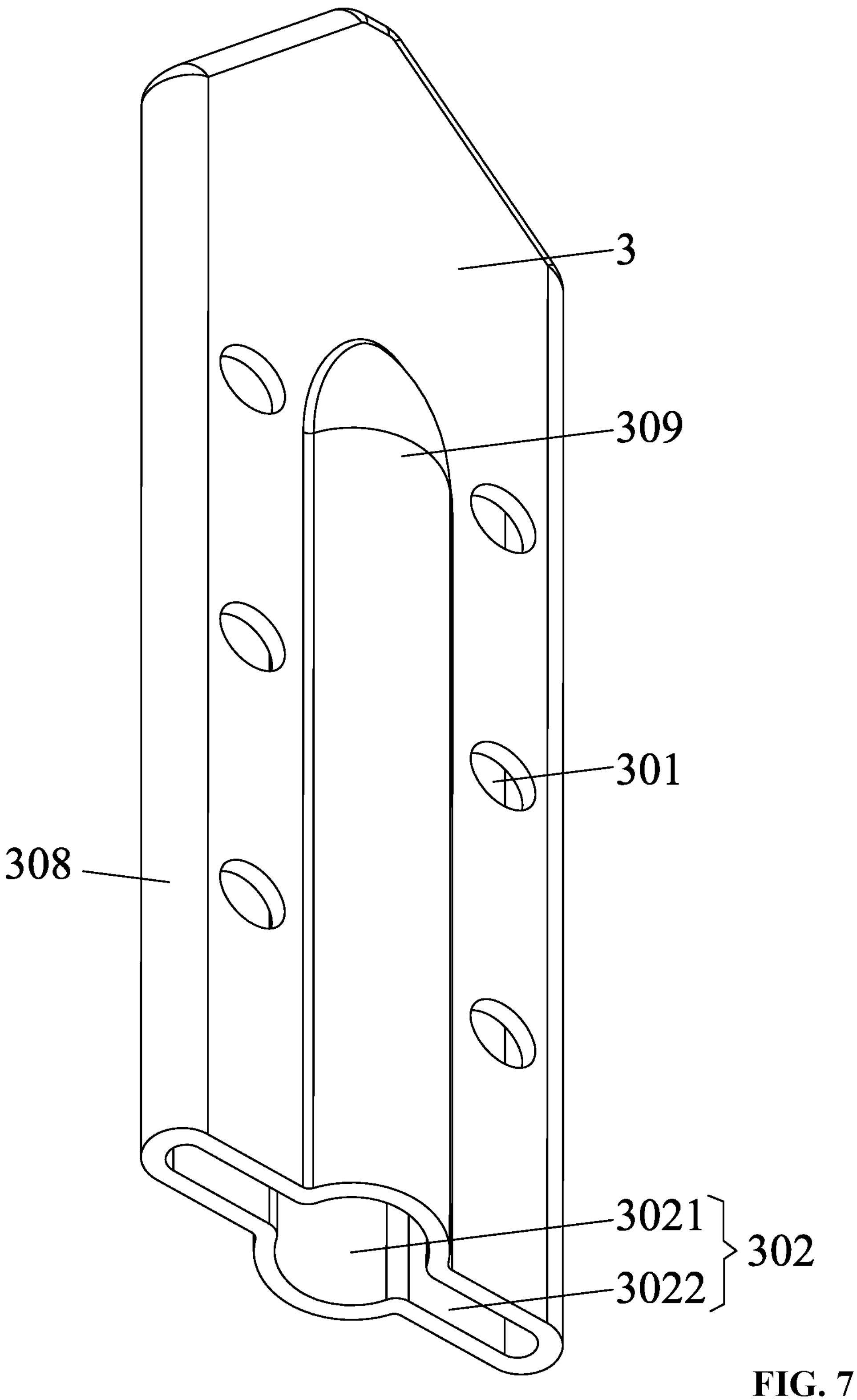
FIG. 7 is a perspective view of a heating element according to Example 3 of the disclosure.

Referring to FIG. 7, the heating element 3 is in an elongated shape. The heating element 3 comprises a sealed top end in the shape of a triangle and thus can be inserted into tobacco materials. The heating element 3 further comprises a side wall 308 surrounding a first space. The shape of the first space is determined by demand. In the example, the side wall 108 surrounds the first space having a cross section which conforms to a pill shape.

The first space functions as a chamber 302. The chamber 302 comprises a first chamber 3021 and a second chamber 3022. The side wall 308 comprises a first side wall 309 and a second side wall disposed opposite to the first side wall 309. The first chamber 3021 is defined by the first side wall 309 and the second side wall. The second chamber 3022 comprises a space outside of the first chamber 3021.

A distance is maintained between the corresponding side edges of the first side wall and the second side wall, thus achieving communication between the first chamber 3021 and the second chamber 3022. In certain examples, when both edges of the first side wall 309 are formed integrally with the corresponding edges of the second side wall or they are connected thereto, the first side wall, the second side wall, and/or a junction therebetween comprise at least one through hole, thus achieving communication between the first chamber 3021 and the second chamber 3022. The first side wall 309 and the second side wall are convex with respect to the sidewall surrounding the second chamber 3022. In certain examples, the inner wall of the side wall 308 is connected to the outer walls of the first side wall 309 and the second side wall, so that the whole first chamber 3021 is disposed in the first space.

The first chamber 3021 comprises an open top through which a temperature sensor is inserted into the first chamber 3021. The other end of the first chamber 3021 communicate with the second chamber 3022, thus providing a uniform distribution of thermal air in the heating element 3.

In the example, the side wall surrounding the second chamber 3022 comprises at least one through hole 301. The second chamber 3022 communicates with outside air of the heating element 3 through the at least one through hole 301.

Example 4

Figure 8:
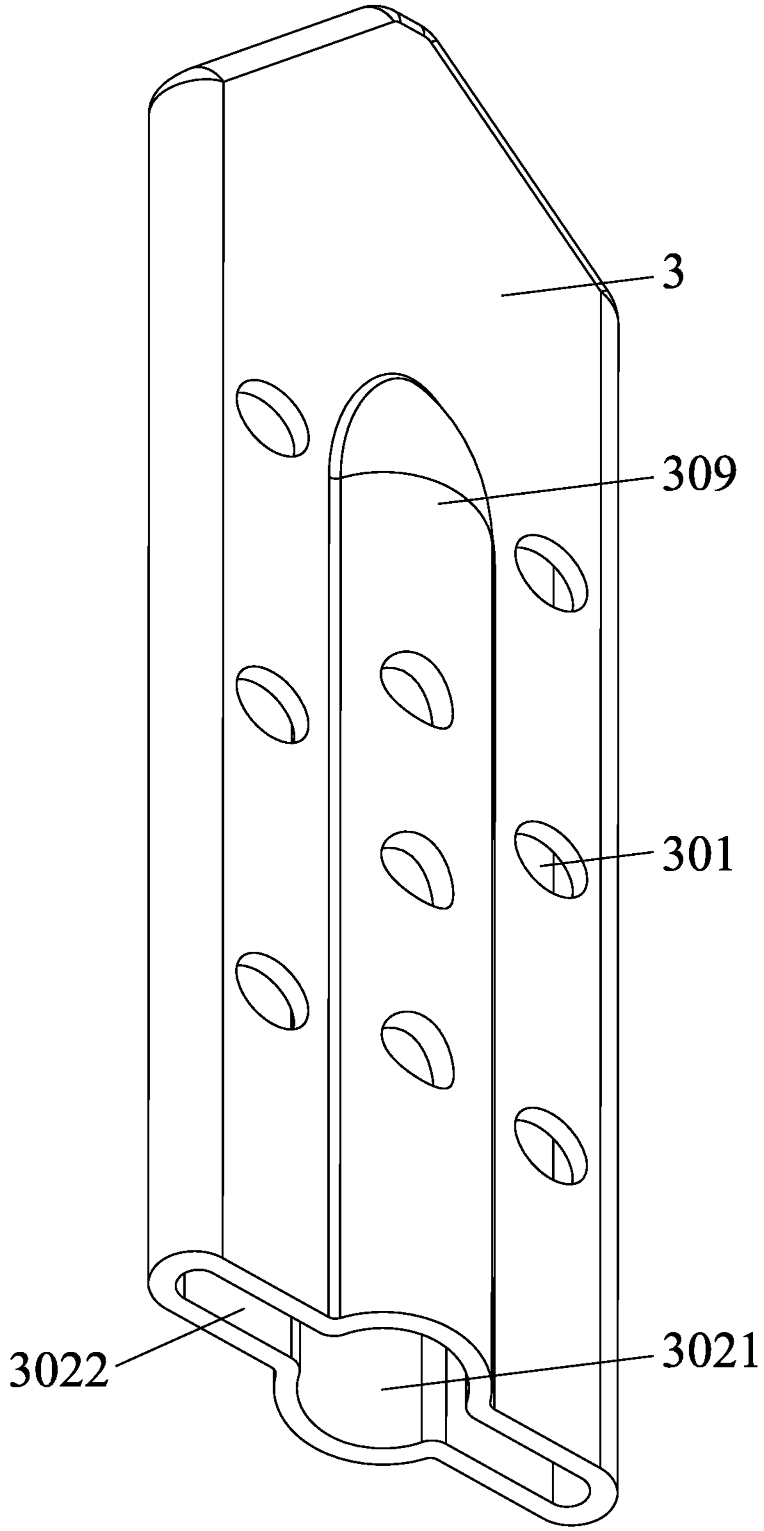
FIG. 8 is a perspective view of a heating element according to Example 4 of the disclosure.

A fourth example of the heating element is illustrated in FIG. 8. It is similar to Example 3, except for the following specific differences: the at least one through hole 301 is disposed on the first side wall, the second side wall, and the side wall surrounding the second chamber 104.

It will be obvious to those skilled in the art that changes and modifications may be made, and therefore, the aim in the appended claims is to cover all such changes and modifications.

The invention claimed is:

1. A heating assembly, comprising a main body and a high-frequency control assembly; wherein:

the main body comprises a heating chamber provided with a first opening;

the main body further comprises a heating element disposed in the heating chamber;

the heating element comprises an elongated sheet and a tube;

one end of the tube is a sealed end, and the other end of the tube is an open end;

the elongated sheet comprises a notch extending along a length of the heating element;

the tube is fixedly disposed in the notch, and the sealed end of the tube abuts against a base of the notch;

the tube comprises a first side wall, a second side wall, and a thermal air chamber surrounded by the first side wall and the second side wall;

the first side wall and the second side wall are convex with respect to the elongated sheet;

each of the first side wall and the second side wall comprises at least one first through hole;

the high-frequency control assembly is disposed outside the heating chamber;

when in use, a tobacco material passes through the first opening and is disposed into the heating chamber; and when the high-frequency control assembly is energized, an electromagnetic filed is produced, and the heating element produces heat to heat the tobacco material.

2. The heating assembly of claim 1, wherein the high-frequency control assembly comprises a coil and a power supply unit; the coil is configured to produce an electromagnetic field that enables the heating element to produce heat; the power supply unit is electrically connected to the coil to provide alternating current to the coil; the coil is wound into a helix with a hollow space; and the heating chamber is disposed in the hollow space.

3. The heating assembly of claim 2, wherein the power supply unit comprises a battery and a high-frequency control board; the battery is electrically connected to the high-frequency control board to supply power to the high-frequency control board; the high-frequency control board is further electrically connected to the coil and a temperature sensor so as to provide alternating current to the coil and receive information about the temperature changes of the heating element.

4. The heating assembly of claim 3, wherein the main body further comprises a housing and a bracket; the housing comprises a first end provided with a cavity; the bracket is disposed in the housing; the bracket comprises an empty space; and the high-frequency control assembly is disposed in the empty space and the coil is disposed in the cavity.

5. The heating assembly of claim 4, wherein the main body further comprises a cover provided with a first end; the first end is concave to form a first recess; the first recess comprises a first bottom wall provided with a second opening; the cover further comprises an air duct communicating with the second opening; and the air duct extends into the hollow space.

6. The heating assembly of claim 5, wherein the main body further comprises a fixing member configured to hold the tobacco material; one end of the fixing member is concave to form a second recess; the second recess comprises a second bottom wall and the first opening is disposed on the second bottom wall; the fixing member comprises a sliding member disposed in the second recess and slidable along an inner wall of the second recess; the other end of the fixing member is in the form of a necked part which is matched with an inner wall of the first recess in size and shape; the fixing member further comprises a hollow tube communicating with first opening through the necked part; the hollow tube corresponds with the first opening; and the hollow tube functions as the heating chamber.

7. The heating assembly of claim 6, wherein the fixing member is detachably disposed in the cavity; the necked part is disposed into the first recess; the hollow tube is disposed through the second opening into the air duct; and an air channel is formed between an outer wall of the hollow tube and an inner wall of the air duct.

8. The heating assembly of claim 7, wherein the main body further comprises a seal member disposed in one end of the air duct and configured to seal the air channel; the seal member comprises a third recess provided with a second through hole; one end of the heating element is fixedly disposed in the third recess so that the thermal air chamber communicates with the second through hole; and the temperature sensor comprises a conducting wire connected through the second through hole to the high-frequency control board.

9. The heating assembly of claim 1, wherein the heating assembly further comprises a temperature sensor and the thermal air chamber comprises a separate chamber; the temperature sensor is disposed in the separate chamber; the heating element is in an elongated shape; the separate chamber is disposed in the middle of the heating element and extends along the length of the heating element.

* * * * *